Patented June 1, 1943

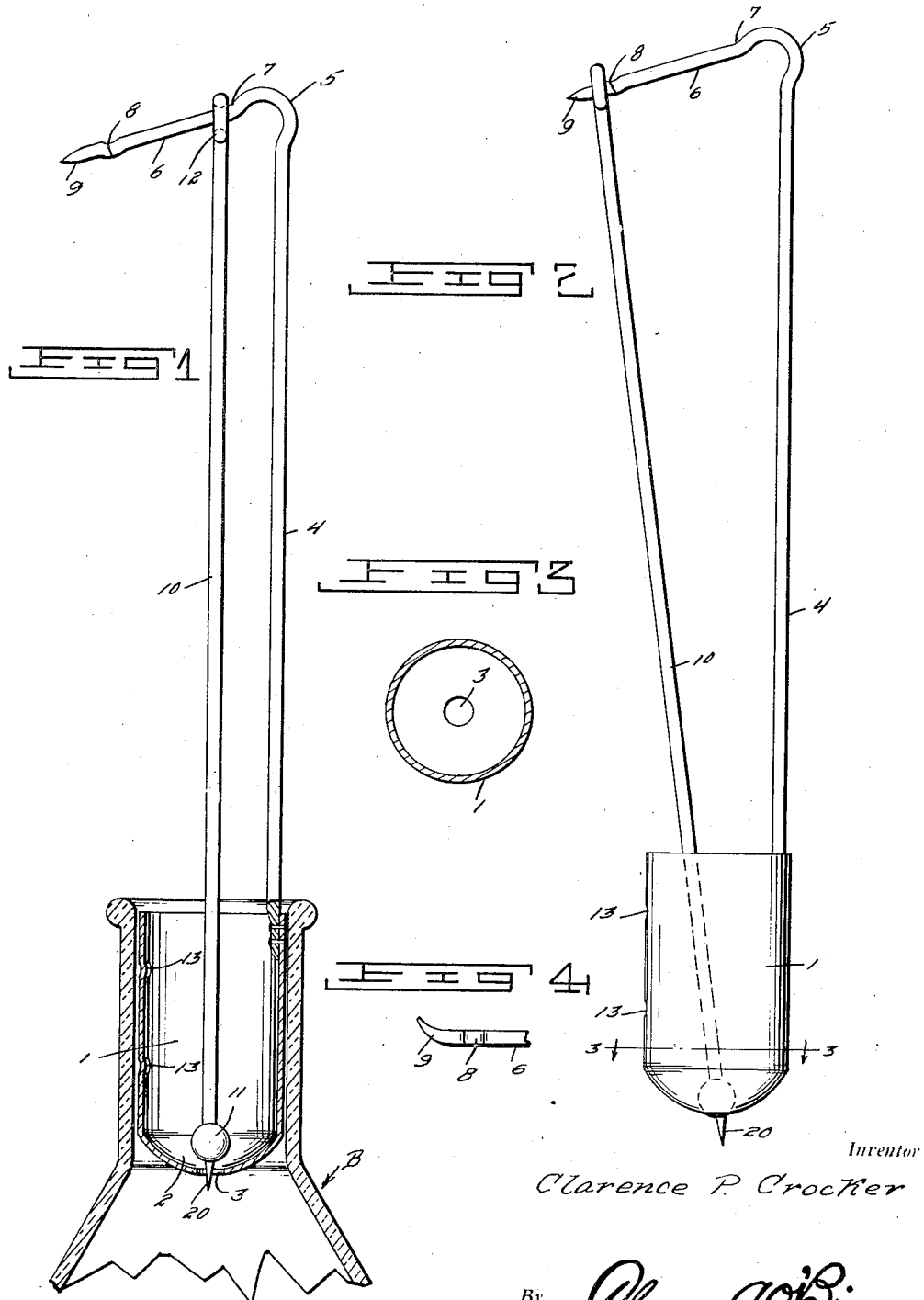

2,320,570

UNITED STATES PATENT OFFICE 2,320,570

CREAM DIPPER

Clarence P. Crocker, Arcata, Calif.

Application October 8, 1941, Serial No. 414,181

2 Claims. (Cl. 210—51.5)

This invention relates to a dipper which is mainly designed for removing cream from the top of milk bottles though it will be understood that the invention may be used for other purposes.

The general object of the invention is to provide a dipper of a shape to enable it to be passed into the neck part of a bottle, a handle extending upwardly from the dipper and a rod having a valve at its lower end for closing a port in the bottom of the dipper, with means associated with the rod and handle for holding the rod in position with the valve for closing the port or in position with the valve opening the port.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is an elevational view with parts in section showing the device in use for removing cream from the top of a milk bottle, this view showing the valve in open position.

Figure 2 is an elevational view with the valve held in closed position by the resiliency of the arm of the handle rod.

Figure 3 is a section on the line 3—3 of Figure 2.

Figure 4 is a fragmentary top plan view of the sloping part of the upper end of the handle.

In these views the numeral 1 indicates the bowl or dipper and this member is formed of very thin material and of a diameter that it can be readily passed into the neck of a milk bottle B as shown in Figure 1.

The lower end of the member 1 is preferably of semi-spherical shape as shown at 2 with a port 3 in its center. A handle forming rod 4 has one end connected to the upper end of the bowl on the inner wall thereof and the upper end of the handle is formed with a loop 5 which connects the vertical part of the handle with a downwardly and outwardly sloping part 6. This part is formed with the upper stop 7 and the lower or outer stop or hump 8 and the free end of this part 6 is curved to one side and pointed as shown more particularly at 9 in Figure 4. This end can be used for removing closure disks for milk bottles. A valve carrying rod 10 has the ball valve 11 at its lower end for closing the port 3 and its upper end is formed with an eye 12 which passes over the part 6. As will be seen when the eye is engaging the stop 7 the valve rod 10 will be held in raised position with the valve 11 uncovering the port 3 but when the rod has been moved to engage the eye with the hump 8 the valve will be in closed position as shown in Figure 2. Inwardly extending indentations 13 are formed in a portion of the side wall of the bowl, these indentations being spaced apart and they act to indicate the amount of cream passing into the bowl so that the user can remove from the bottle the desired amount of cream.

The valve rod is placed in the position shown in Figure 1 to cause the valve 11 to open the port 3 and then the bowl is lowered into the neck of the bottle and, of course, as this is taking place the cream will flow through the port 3 into the bowl. Then when the desired amount of cream has entered the bowl the rod 10 is moved to the position shown in Figure 2 so that the valve will close the port and then the device can be removed from the bottle and placed over a pitcher or the like after which the valve is open so that the cream will pass from the bowl into said container.

Of course, after a certain amount of cream has been taken from the bottle the device can be lowered into the bottle without opening the valve, if desired, as the cream remaining in the bottle will flow over the top of the bowl instead of through the port 3.

A pointed projection 20 may be formed on the lower part of the valve as shown in Figures 1 and 2 to guide the valve to closing position over the port, this guiding member being especially useful where the bowl is formed with a flat bottom.

Normally the parts will move by gravity to valve closing position with the eye 12 sliding down the arm 6 to the hump 8 as shown in Figure 2 and that form of the invention shown in Figures 1, 2, 3 and 4. However, in some cases the eye 12 can be moved past the hump 8, as shown in Figure 2, so that the resiliency of the arm 6 will hold the valve closed under pressure. When the valve is to be opened the eye 12 is moved up the arm 6 until it strikes the stop 7, as shown in Figure 1, but when the eye is released by the finger the parts will move to valve closing position. However, if desired the stop 7 may be formed by a recess into which the eye 12 can be moved so that the parts will be held with the valve in open position until the eye is pushed from the recess.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A cream dipper for removing cream from the top of a milk bottle comprising an elongated bowl adapted to fit into the neck of a milk bottle and having an axial inlet port in the bottom thereof, a rod-like handle attached at one end to the rim of the bowl to extend upwardly therefrom at one side thereof, a ball valve in said bowl movable upwardly and downwardly to open and close said port, respectively, and provided with a stud extending into said port to guide the valve in closing movement thereof, a valve operating rod attached at one end to said ball valve and extending out of said bowl for lifting and lowering to move said valve upwardly and downwardly, respectively, a loop on the other end of said rod and means to retain said valve operating rod in lifted or lowered position comprising a lateral extension on said handle inclined with respect thereto and passing through said loop, the loop being adjustable along said extension into different set positions.

2. A cream dipper for removing cream from the top of a milk bottle comprising an elongated bowl adapted to fit into the neck of a milk bottle and having an axial inlet port in the bottom thereof, a rod-like handle attached at one end to the rim of the bowl to extend upwardly therefrom at one side thereof, a ball valve in said bowl movable upwardly and downwardly to open and close said port, respectively, and provided with a stud extending into said port to guide the valve in closing movement thereof, a valve operating rod attached at one end to said ball valve and extending out said bowl for lifting and lowering to move said valve upwardly and downwardly, respectively, a loop on the other end of said rod, and means to retain said valve operating rod in lifted or lowered position comprising a lateral extension on said handle inclined with respect thereto and passing through said loop, the loop being slidable along said extension, and notch forming bends in said extension for seating said loop.

CLARENCE P. CROCKER.